United States Patent [19]
Wolf et al.

[11] Patent Number: 4,925,163
[45] Date of Patent: May 15, 1990

[54] SPRING ELEMENT

[75] Inventors: Franz J. Wolf; Hubert Pletsch, both of Bad-Soden-Salmunster, Fed. Rep. of Germany

[73] Assignee: Woco Franz-Josef Wolf & Co, Fed. Rep. of Germany

[21] Appl. No.: 308,335

[22] Filed: Feb. 9, 1989

[30] Foreign Application Priority Data

Feb. 9, 1988 [DE] Fed. Rep. of Germany ....... 3803909

[51] Int. Cl.$^5$ .............................................. F16F 1/44
[52] U.S. Cl. ..................................... 267/153; 267/145
[58] Field of Search ................ 267/141, 145, 153, 292

[56] References Cited

U.S. PATENT DOCUMENTS

| 1,922,228 | 8/1933 | Brown | 267/145 |
| 2,025,712 | 12/1935 | Bickett | 267/145 |
| 2,371,788 | 3/1945 | Weeber | 267/145 |
| 4,750,720 | 6/1988 | Wolf et al. | 267/153 X |
| 4,776,573 | 10/1988 | Wolf et al. | 267/153 X |

Primary Examiner—Duane A. Reger
Attorney, Agent, or Firm—Lowe, Price, LeBlanc, Becker & Shur

[57] ABSTRACT

The invention relates to a spring element (1) used for elastically supporting large loads. The spring element comprises an elastic rubber block having uniformly distributed spherical cavities (2) which are intersected by clindrical or prismatic channels (3) also formed in the rubber material. The channels (3) form groups of channels defining areas stacked on top of each other in the direction of the vector of a load to be supported, which areas neither intersect nor touch each other. These areas may be three-dimensionally-shaped areas, for example envelopes of a cone or corrugated areas, as well as mutually parallel planes oriented obliquely to the direction of the load vector. When projected onto a horizontal plane, the groups of channels (3) are either radially extending and uniformly angularly spaced if the areas are envelopes of a cone, or are mutually parallel if the areas are obliquely arranged planes. In no way, the channels (3) intersect or touch each other. Alternatively, an axial channel (6), which is at least open at one side, is arranged centrally in the direction of the load vector wherein none of the channels (3) or the spherical cavities (2) contact or intersect this central axial channel (6).

22 Claims, 2 Drawing Sheets

FIG. 5
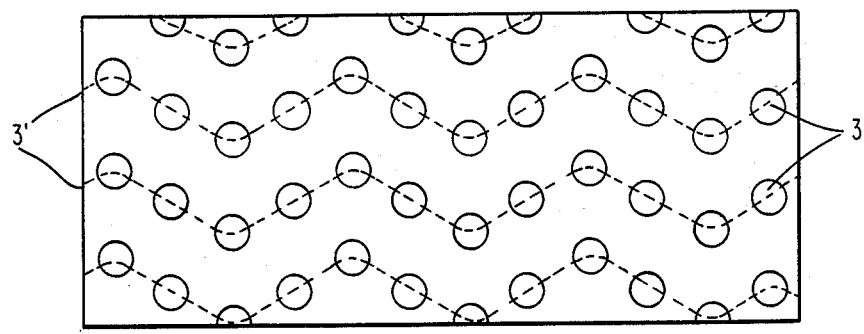
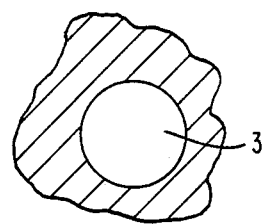
FIG. 6a
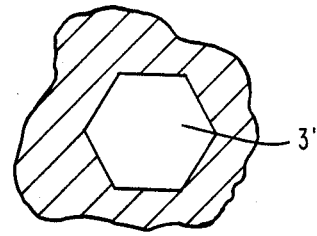
FIG. 6b

SPRING ELEMENT

TECHNICAL FIELD

The present invention relates to a spring element for elastically supporting one port relative to another port and, more specifically, to an elastic support buffer for cushioning a vehicle engine.

BACKGROUND ART

When elastically supporting relatively large masses it is difficult to attain spring characteristics which are as soft as possible, i.e., comprising a flat spring characteristic curve, while at the same time achieving good durability of the spring elements. Another problem which has to be taken into account when constructing spring elements is that the acoustically insulating behaviour between the two parts to be elastically connected has to be as good as possible. Therefore, elastic support buffers are used frequently in engineering fields and, especially, in vehicle construction for cushioning engines. Nowadays, spring elements consisting of a relatively rigid elastomer material which are interspersed by channels to attain soft spring characteristics and to decrease the local loads inside the material are used instead of solid elastomer blocks according to the prior art which comprised a relatively fast fatigue material. When the elastomer blocks are compressed by a load, the volume of the channels is decreased by the displaced material, which means the channels are used as a deformation zone, such that the deformation of the outer shape of the blocks and the high local loads caused by the nonhomogeneous load concentration can be reduced.

An example of a buffer of the above type is disclosed in German application DE 35 35 897 A1, wherein an elastomer block is interspersed with channels intersecting cavities uniformly distributed inside the elastomer material. The channels form groups of channels extending equidistantly spaced and parallel to each other wherein these groups of channels are arranged in planes stacked on top of each other with respect to the direction of the vector of the load and wherein the planes defined by the groups of channels are orientated horizontally and parallel to each other, which means that the channels neither intersect nor contact each other. Each plane is rotated for a certain constant angle with respect to the plane below whereat the direction of the rotation remains unchanged such that the channels are helically distributed in space. For example, when having a rotation angle of 90°, an alternating arrangement of the channels is provided wherein the channels cross each other without intersecting or touching each other such that the cavities form a packed cubic lattice. Rubber springs of this kind comprise exceptionally good acoustically damping characteristics, a flat spring characteristic curve and a high mechanical rigidity, but they are limited in their range of application by the horizontal orientation of the groups of channels.

SUMMARY OF THE INVENTION

It is an object of the present invention to provide a spring element for use in complex structures, for example when loads are acting upon the spring element from different directions, and for complex functions, such as when the spring element has to stabilize itself with respect to transversal loads.

To attain this object, a spring element according to the present invention comprises a rubber block interspersed by uniformly distributed cavities.

A plurality of these cavities are connected by one channel each. The cylindrical or prismatic channels are dimensioned such that their cross-sectional area is at least 25% of the largest cross-sectional area of the nearest cavity intersected by the respective channel. The channels, which are at least open at one side, are arranged in groups which, according to a first embodiment of the invention, each define a three-dimensionally-shaped area, for example an envelope of a cone or a corrugated area. These three-dimensionally-shaped areas are stacked on top of each other with respect to the direction of the vector of the load to be supported and neither intersect nor touch each other. Projected onto a horizontal plane, the channels of each envelope of a cone are preferably radially extending and uniformly angularly spaced without intersecting or touching each other in the center.

By the interlacing arrangement of the sections of the block stacked on top of each other, each section being defined by two adjacent three-dimensionally-shaped areas which may be shaped like the envelope of a cone or corrugated area, the spring element is stabilized with respect to lateral displacement of the elastomer block or the sections of the block, respectively. In contrast to the above prior art spring element, the form stability of the rubber block loaded in the direction of the central axis of the cone is improved and the load acting on the block is distributed more uniformly.

According to a further embodiment of the spring element of the present invention, a central channel extending axially in the direction of the load vector to be supported is provided inside the spring element. This centrally-arranged axial channel which may be open at one side or at both sides, respectively, is arranged such that none of the cavities or channels leads into that axial channel. With the axial channel, which may be receive a stabilizing or guide rod, an additional stabilizing effect may be achieved which counteracts lateral displacement of the respective sections of the elastomer block defined each by two groups of channels.

It is astonishing and surprising even to a person skilled in the art that neither the spring characteristics nor the acoustic damping characteristics of the spring element are decreased. To the contrary, in many applications the acoustic damping characteristics with respect to the two parts to be connected elastically by the spring element can be improved.

According to a further embodiment of the spring element of the present invention, the respective groups of channels define plane areas which are also arranged on top of each other, but in an oblique orientation to the direction of the load vector to be supported and parallel to each other such that they neither intersect nor contact each other. Accordingly, the corrugated areas named above may be arranged obliquely to the direction of the load vector to be supported. Projected onto the horizontal plane, the channels of each group are preferably arranged parallel to each other. In contrast to the horizontal arrangement of the channels according to the prior art, in this embodiment an additional material dislocation in the direction of the oblique planes defined by the groups of channels is achieved by the arrangement of the channels obliquely to the direction of the load vector. The deformation of the elastomer occurs by the translation of the sectors of the block parallel to each other, each defined by two adjacent oblique planes, as well as by an inner deformation of the cavities and the channels. However, the essential effect is that the way of the material deformation is extended by the oblique arrangement of the channels. The extent of the deformation of the block or its outer shape, respectively, surprisingly is relatively small and can be tolerated compared with the bulb deformations which have to be accepted otherwise.

The local loads in the elastomer material can be reduced by the uniform distribution of the deformation forces caused by the load to be supported while, simultaneously, the spring characteristics can be improved, which means that a flat spring characteristic curve is achieved. At the same time, transversal loads acting between the two parts connected elastically by the spring element can be compensated. Accordingly, a harder elastomer material can be used alternatively without having to accept deteriorated spring characteristics. Therefore, the durability of a spring element according to the present invention can be extended while maintaining effectively the same spring characteristic curve.

BRIEF DESCRIPTION OF THE DRAWING

FIG. 5 is a sectional view of a third embodiment of a spring element of the invention depicting the channels arranged to define corrugated areas; and FIGS. 6a and 6b depict channels of cylindrical or prismatic cross-section.

BEST MODE FOR CARRYING OUT THE INVENTION

Figure 1:
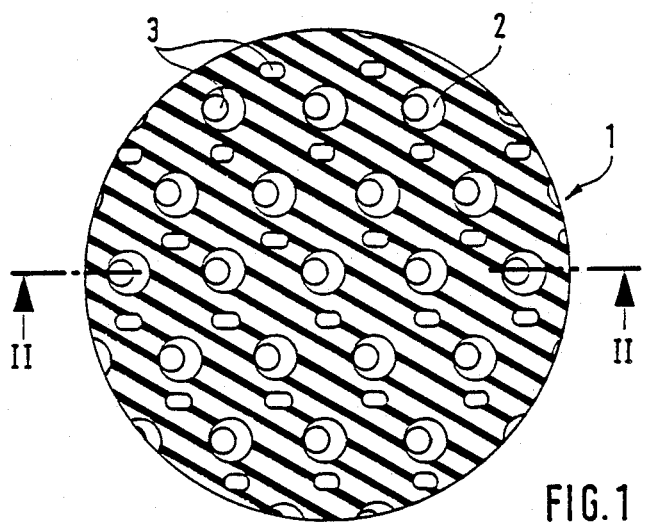
FIG. 1 shows schematically a horizontal section of a first embodiment of a spring element according to the present invention taken along line I—I in FIG. 2.
Figure 2:
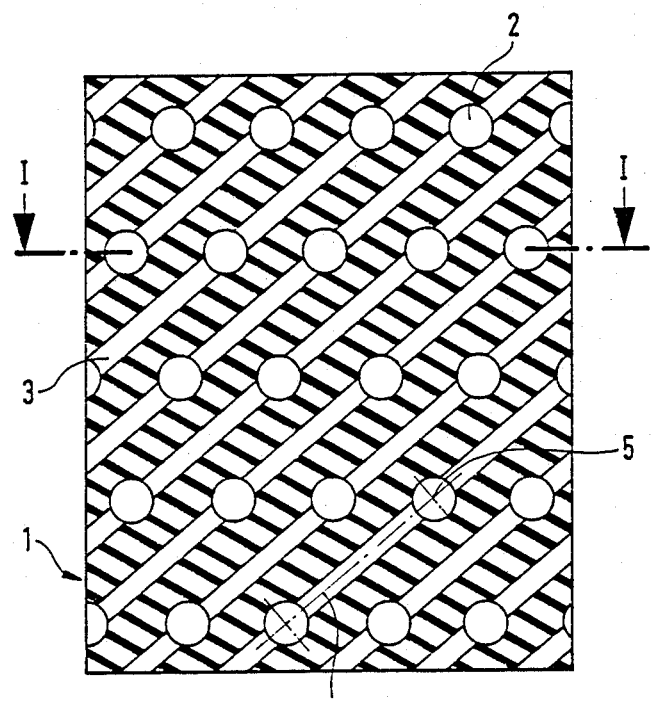
FIG. 2 shows the embodiment of FIG. 1 vertically-sectioned along line II—II in FIG. 1.

According to FIGS. 1 and 2, spherical cavities 2 are distributed uniformly inside the whole block-shaped spring element 1 consisting of a resilient material such that they are located at the sites of a rhombohedral lattice. The cavities 2 are intersected by mutually parallel cylindrical (FIG. 6a) or prismatic channels 3 which do not contact each other. The channels 3 (e.g., FIG. 6b) form groups of channels defining planes stacked on top of each other extending obliquely to the direction of the vector F of the load to be supported, which vector F in FIG. 1 is perpendicular to the drawing plane and in FIG. 2 in the drawing plane oriented vertically. The planes defined by the groups of channels are mutually parallel, which means that the channels 3 neither intersect nor touch each other. The central axes 4 of the channels 3 extend through the centers 5 of the spherical cavities 2. Each of the channels 3 intersects a plurality of cavities 2, wherein the diameter of the cavities 2 is larger than the diameter of the channels 3, but not more than four times the diameter of the channels 3. The distance between each of the channels is constant. The channels 3 interspersing the whole block are either open at one side or open at both sides.

When the spring element is compressed, the dislocated elastomer material reduces the volumes of the cavities and of the channels arranged in the spring block, whereat the local loads are reduced by the translational movement of the sections of the block defined by two groups of channels, each, across the planes defined by said groups of channels.

Figure 3:
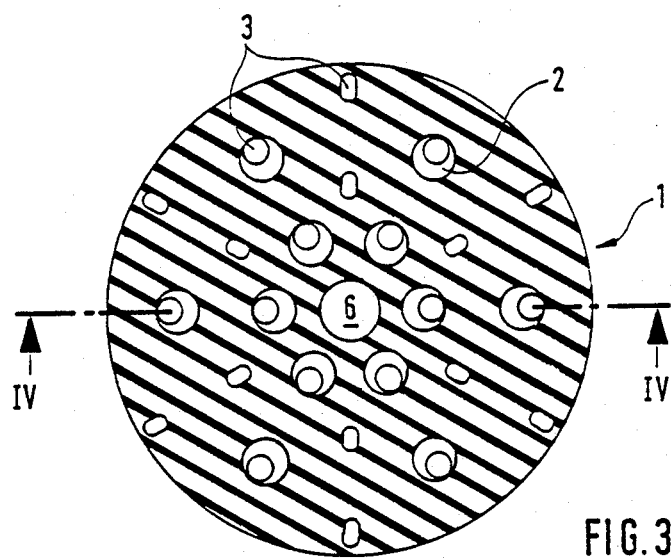
FIG. 3 shows schematically a horizontal section of a second embodiment of a spring element according to the present invention, taken along line III—III in FIG. 4.
Figure 4:
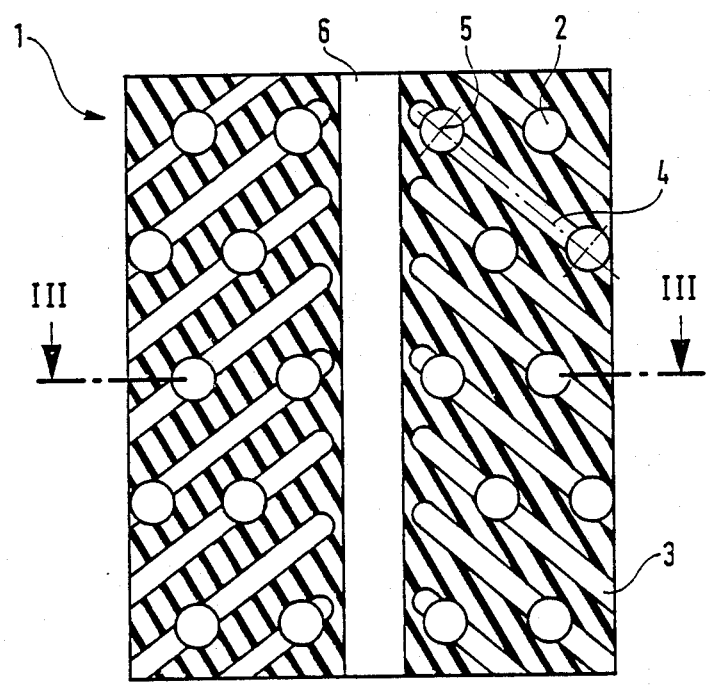
FIG. 4 shows the embodiment of FIG. 3 vertically-sectioned along line IV—IV in FIG. 3.

According to the embodiment of the spring element 1 of the present invention shown in FIGS. 3 and 4, each group of channels defines a three-dimensionally-shaped area formed like the envelope of a cone instead of the obliquely arranged plane of the embodiment illustrated in FIGS. 1 and 2. These envelopes of a cone are stacked on top of each other in the direction of the vector of the load to be supported such that their cone points are located on the central axis of the rubber block extending in the direction of the load vector to be supported, whereat the envelopes neither contact nor intersect each other. The channels 3 of every group of channels (envelope of a cone) are radially extending and, in particular, uniformly angularly spaced when projected onto the horizontal plane, whereat they neither touch not intersect each other in the center. Therefore, the channels 3 are open at one side, only, which means that the channels 3 are closed inwards and open outwards. Alternatively, an axial channel 6 extending centrally in the direction of the load vector can be provided. This central axial channel 6 is at least open at one side and neither intersects nor touches any of the cavities 2 or the channels 3, respectively, such that the configuration of the channels closed at one side remains unchanged.

When an external force acts upon the spring element 1, the elastomer block is loaded in the direction of its longitudinal axis and the displaced elastomer material reduces the volumes of the cavities 2,3 and 6 inside the elastomer block. By the conical structure of the sections of the block stacked on top of each other as defined respectively by two groups of channels a stabilizing effect with respect to lateral displacement of the sections of the block is achieved by the interlacing arrangement.

FIG. 5 is an illustration of another embodiment of the invention wherein channels 3 are stacked on each other to define corrugated areas 3'.

The acoustic insulating characteristics with respect to the two parts connected elastically by the spring element are achieved by the oblique arrangement of the planes or the three-dimensionally-shaped areas, respectively, defined by the groups of channels as well as by the central axial channel. The improvement is caused by increasing the scattering effects in the cavities as well as by reducing material bridges acting as acoustic conductors.

We claim:

1. A spring element comprising a resilient block interspersed with a plurality of channels uniformly distributed in the block, said channels intersecting cavities and wherein said channels are arranged with their longitudinal axis extending obliquely with respect to the direction of a vector of a load to be supported.

2. A spring element according to claim 1, wherein said channels are arranged in stacked areas with each of said areas respectively defining an envelope of a cone.

3. A spring element according to claim 1, wherein the cross-sectional area of said channels is at least 25% of the largest cross-sectional areas of the cavities intersected by the respective channel.

4. A spring element according to claim 1, wherein said cavities are spherically-shaped and said channels are at least one of cylindrically and prismatically-shaped.

5. A spring element according to claim 1, wherein the channels in each of said areas stacked on top of each other extend radially when projected onto a horizontal plane and that said channels are uniformly angularly spaced from each other about the central longitudinal axis of the block without contacting each other.

6. A spring element according to claim 1, further including a longitudinal centrally-arranged axis channel inside the block open to at least one side thereof and extending in the direction of the vector of the load to be supported.

7. A spring element according to claim 6, wherein said channels do not contact said centrally-arranged axially extending channel.

8. A spring element according to claim 1, wherein said channels are at least open to one side without intersecting each other.

9. The spring element according to claim 1, wherein said channels neither intersect nor substantially contact each other.

10. The spring element according to claim 1, wherein the longitudinal axes of said channels extend obliquely with respect to a plane passing through a top surface of the block against which top surface acts the load to be supported.

11. The spring element of claim 1, wherein said channels are arranged in the block as areas of channels respectively stacked on top of each other in relation to the direction of the load vector with substantially each said area defining a three-dimensional nonplanar shape.

12. A spring element comprising a resilient block interspersed with a plurality of channels uniformly distributed in the block, said channels intersecting cavities and said channels being arranged in the block as areas of channels respectively stacked on top of each other in relation to the direction of a load vector of a load to be supported with substantially each said area defining a three-dimensional nonplanar shape.

13. The spring element of claim 12, wherein said channels are arranged in stacked areas with each of said areas respectively defining an envelope of a cone.

14. The spring element of claim 12, wherein the cross-sectional area of said channels is at least 25% of the largest cross-sectional area of the cavities intersected by their respective channel.

15. The spring element of claim 12, wherein said cavities are spherically shaped and said channels are at least of cylindrically and prismatically shaped.

16. The spring element of claim 12, wherein said channels in each of said areas stacked on top of each other extend radially when projected onto a horizontal plane and that said channels are uniformly angularly spaced from each other about the central longitudinal axis of the block without contacting each other.

17. The spring element of claim 12, further including a longitudinal centrally-arranged axial channel inside the block open to at least one side thereof and extending in the direction of the load vector.

18. The spring element of claim 12, wherein said channels do not contact said centrally-arranged axially extending channel.

19. The spring element of claim 12, wherein said channels are at least open to one side of the block without intersecting each other.

20. The spring element of claim 13, further including a longitudinal centrally-arranged axial channel inside the block open to at least one side thereof and extending in the direction of the load vector, said channels extending without contacting the centrally-arranged axially extending channel.

21. A spring element according to claim 12, wherein said channels are arranged in stacked areas with each of said areas defining a corrugated region defined by a curve extending radially through the centerline of each channel in said area.

22. A spring element according to claim 12, wherein the channels in each of said areas stacked on top of each other are mutually parallel when projected onto a horizontal plane.

* * * * *